United States Patent [19]
Broussaud

[11] 4,064,538
[45] Dec. 20, 1977

[54] METHOD AND DEVICE FOR DISPLAYING A PICTURE FILM VIA A VIDEO-DISC

[75] Inventor: Georges Broussaud, Paris, France

[73] Assignee: Thomson-Brandt, Paris, France

[21] Appl. No.: 669,885

[22] Filed: Mar. 24, 1976

[30] Foreign Application Priority Data

Mar. 28, 1975   France .................................. 75.09917

[51] Int. Cl.² .............................................. H04N 5/76
[52] U.S. Cl. ..................................... 358/128; 358/138; 360/9; 360/23; 360/33
[58] Field of Search ............... 358/127, 128, 130, 131, 358/132, 133, 138; 360/9, 32, 33, 35, 37, 22, 23

[56] References Cited

U.S. PATENT DOCUMENTS

| | | | |
|---|---|---|---|
| 2,907,819 | 10/1959 | Perilhou | 360/9 |
| 3,309,461 | 3/1967 | Deutsch | 358/138 |
| 3,499,980 | 3/1970 | Smierciak | 358/138 |
| 3,526,900 | 9/1970 | McCoy | 360/32 |
| 3,564,127 | 2/1971 | Sziklai | 360/9 |
| 3,683,111 | 8/1972 | Southworth | 360/9 |
| 3,697,678 | 10/1972 | Belleson | 360/33 |
| 3,723,644 | 3/1973 | Haskell et al. | 360/9 |

Primary Examiner—Raymond F. Cardillo, Jr.
Attorney, Agent, or Firm—Cushman, Darby & Cushman

[57] ABSTRACT

A method and apparatus for displaying a picture film via a video-disc which consists in analyzing the pictures of the film on a plurality of interlaced fields which are successively recorded onto a video-disc. These fields are then read simultaneously on this video-disc and the video signal thus obtained are used for modulating a display apparatus scanned according to a primary raster with a superimposed raster. A coding device is used for mixing the video signals and producing signals for synchronizing the display apparatus.

3 Claims, 5 Drawing Figures

FIG. 4

METHOD AND DEVICE FOR DISPLAYING A PICTURE FILM VIA A VIDEO-DISC

This invention relates to methods for displaying picture films. The invention also relates to the apparatus and recordings which use this process. More particularly, the invention relates to methods of the kind which, for displaying of the type in question, use the recording of video signals on discs which are then read, generally by optical means. These discs are known as video discs and will be refered to as such herein after.

It is known that cinematographic apparatus and films can be used for such displaying. The films used are expensive and fragile. In addition, the methods used for copying these films are long and complicated. Accordingly, attempts have been made to use a video disc by coupling the reader of this video disc with an apparatus for projecting the television image obtained onto a large screen which would resolve all these problems. Unfortunately, the definition of the image reproduced from a conventional video disc is inadequate. Accordingly, it has to be improved whilst at the same time retaining the advantages of the video disc and, in particular, the duration of the recording contained in it.

One solution to this problem is to use a method for compressing and extending the recorded signal, exploiting the high redundancy of the video signals used and the subjective physiological properties of human vision.

The method according to the present invention utilises one such physiological property, which is that the images intended to translate a rapid movement may be observed with low definition, whereas their content has to be frequently renewed, whilst the images translating an inaminate state or a slow movement have to be observed with high definition, whereas their content may be renewed less often. This property applies to the observation both of the fixed elements and of the mobile elements of the same succession of animated images.

In accordance with the present invention it is provided a method for displaying a picture film, said film comprising a succession of images, said method comprising the steps of:

analysing each of said images on at least one frame of K × L lines (K and L being positive integers); said frame being divided into K interlaced fields, said sub fields being analysed successively for providing K successive video signals, and said video signals having a bandwidth extending to a fixed upper frequency;

recording successively said K successive video signals onto a video-disc;

reading out of said video-disc simultaneously K − i (i being a positive integer) video signals pertaining to one picture and i video signals pertaining to the next successive picture of said one picture; said reading out being carried repeatedly with FIG. i changing from o to K;

sampling successively said K − i and i video signals at a rate substantially equal to said upper frequency, for providing a succession of samples;

collecting said samples for providing a modulation signal; and modulating display means actuated by said modulation signal; said display means comprising a screen and being scanned along a composite raster consisting of a primary raster of L lines and a secondary raster formed with sawtooth superimposed upon each of said L lines; said composite raster distributing on said screen light dots corresponding to said sampling; and said light dots being distributed on an reconstructed frame of K × L lines.

For a better understanding of the invention, and to show how the same may be carried into effect, reference will be made to the ensuing description and to the attached figures among which:

Figure 3:
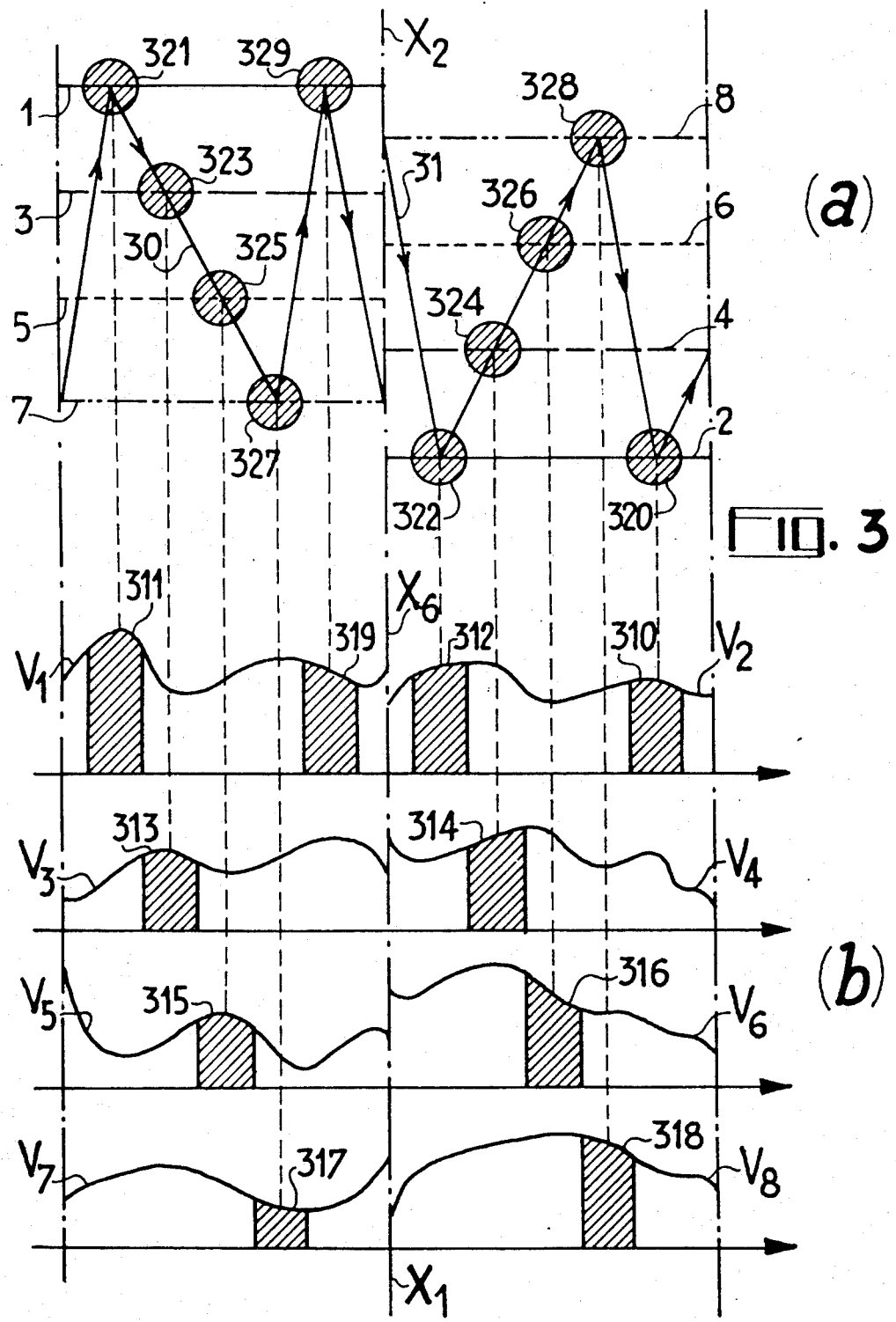
Figure 4:
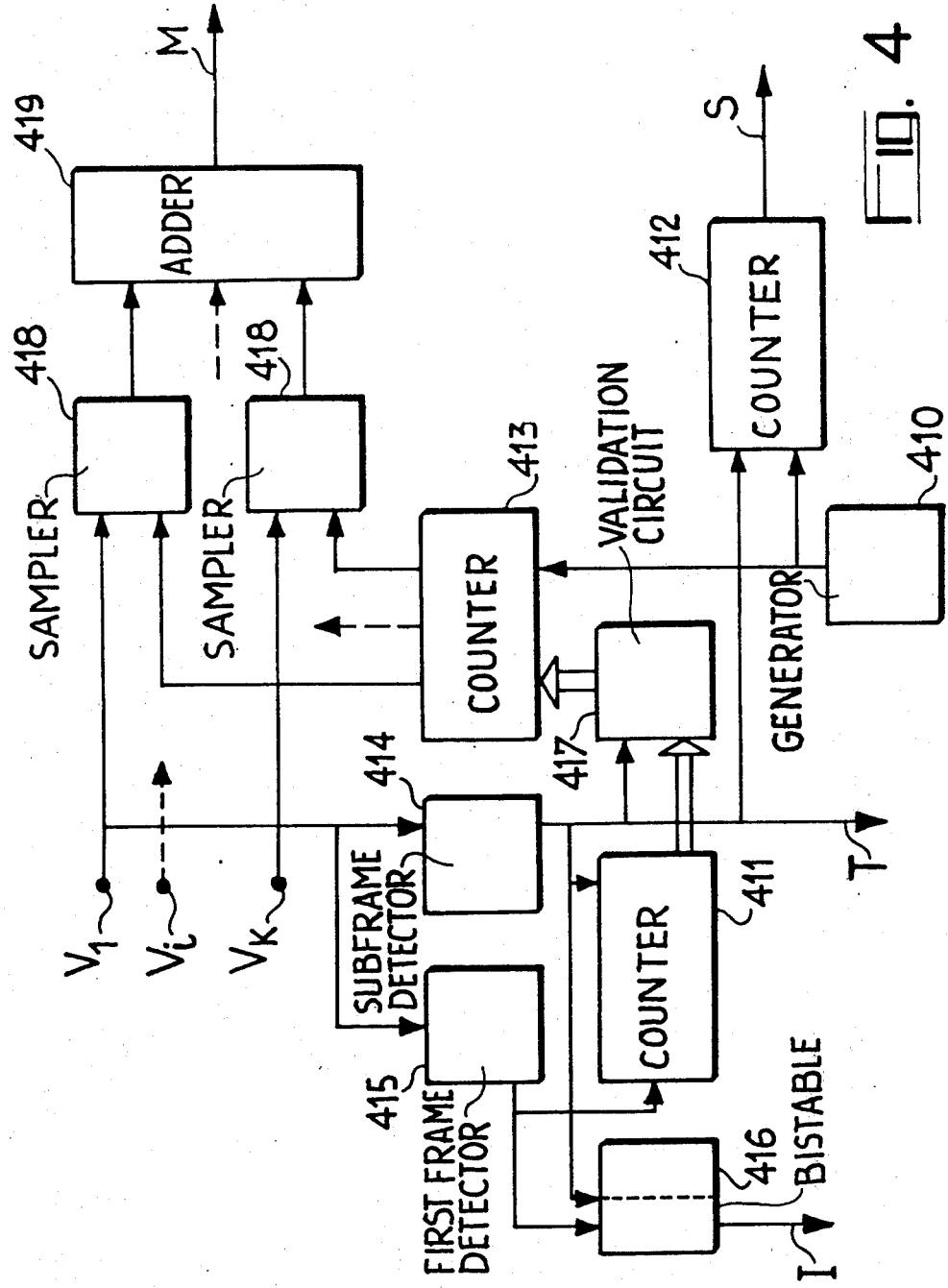

FIG. 3 consisting of 3A and 3B illustrates a part of such a scan;

FIG. 4 illustrates a block diagramm of an apparatus for carrying out the reproduction step of the method according to the invention.

Figure 1:
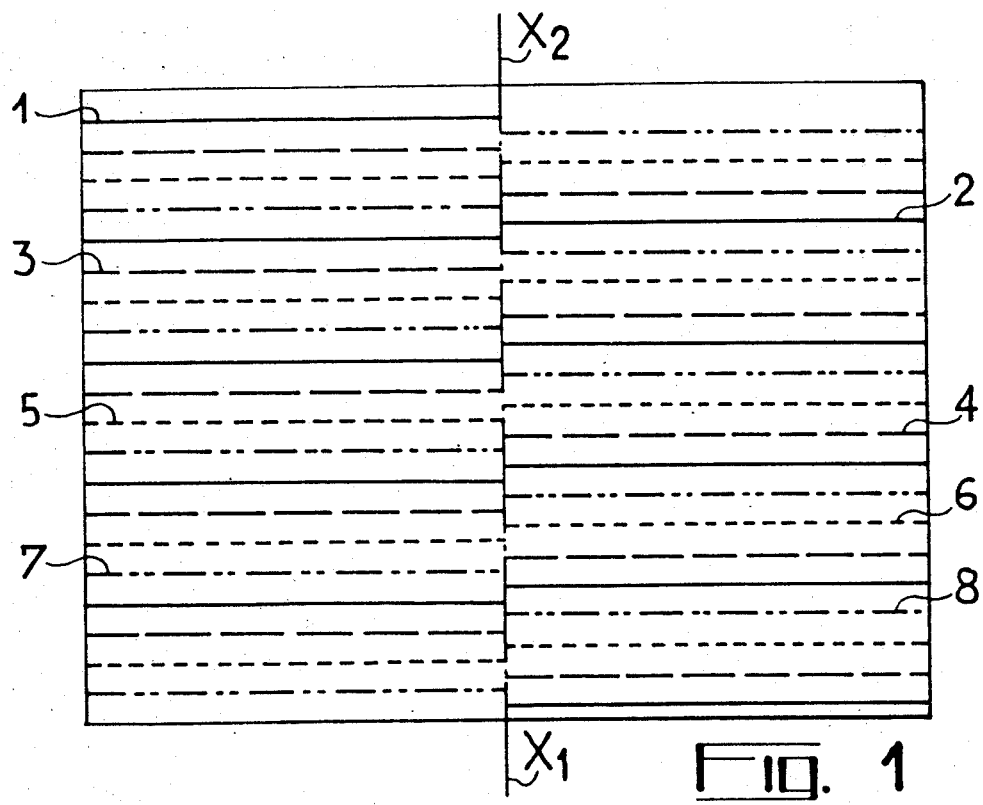
FIG. 1 illustrates diagrammtically a picture analysis made by the method according to the invention.

FIG. 1 illustrates the field analysed by an analysing apparatus according to the invention, for example an electronic camera. The transverse lines represent the lines of the analysis screens. In the interests of clarity, the drawing is based on the following conditions:

analysis on $5 \times 4 \times 2 = 40$ lines;

the lines are shown as horizontal;

the interlacing is obtained artificially and not by using and odd number of lines;

the odd order fields are shown on the left of the axis $X_1X_2$, whilst the even order fields are shown on the right of that axis.

Accordingly, analysis is carried out on the basis of two principal interlaced fields of 20 lines. We shall refer to the interval between two lines of one of these principal fields by the expression "jump".

These principal fields are composed of 4 secondary fields of 5 lines staggered relative to one another by one jump. The first principal fields comprises the secondary fields 1, 3, 5 and 7, whilst the second principal field comprises the secondary fields 2, 4, 6 and 8.

This analysis begins with the secondary field 1 and continues with the secondary field 2, followed by the secondary field 3, etc. It is pointed out that the odd secondary fields are staggered downwards, whilst the even secondary fields are staggered upwards, which enables the major part of troublesome stroboscopic effects to be avoided. In addition, the principal field frame is staggered upwards relative to the second principal field by half a jump. Thus, if only these two principal fields are considered, analysis is a normal analysis on the basis of two interlaced fields.

The scanning signals, both frame and line scanning signals, will be entirely ordinary except that the line frequency will be K times (in this case 4) lower than that which would be necessary for analysis onthe basis of the two principal fields. On the other hand, it will be necessary to provide a phase control for these signals to obtain the various staggers in the proper direction. This result may be achieved with, for example, a sequencer counting the successive secondary fields and delivering synchronisation signals to the scanning oscillators.

The band width of the video signal obtained is a direct function of the number of lines analysed per second and, accordingly, of the number of secondary fields and, hence, principal fields analysed per second.

In conventional processes, the number of fields (corresponding in this case to the principal fields) analysed per second is fixed in order on the one hand to correctly reproduce the movements (which results in approximately 24 complete images per second being taken) and on the other hand to avoid flickers (which results in an interlacing of two fields per image being used).

In the method according to the invention, one pair of interlaced secondary fields makes it possible effectively to satisfy these two requirements in the usual way for flickers and because the analysis given by two secondary fields, although approximate, enables the movements to be correctly reproduced by virtue of the properties of human vision explained earlier on. The definition required for the reproduction of fixed details will be supplied by the 24 K successive secondary fields which will be simultaneously reproduced, as will be shown in the explanation of the reproduction phase.

Accordingly, 25 × 2 = 50 secondary fields per second are analysed instead of the same number of principal frames. Accordingly, this reduces the band width of the video signal by the factor K (it will be recalled that there are K secondary fields in one principal field).

For example, taking as reference the conventional standard of 625 lines, which corresponds to an analysis on the basis of 50 fields of 312 lines per second (in fact 312.5 to obtain the interlacing) and to a band width of approximately 6 MHz, a factor K = 4 would give an analysis on the basis of 50 secondary frames of 78 lines per second and the band width of the video signal would then be restored to approximately 1.5 MHz whilst at the same time substantially retaining the initial quality of the images reproduced.

Conversely it is possible to utilise an analysis on the basis of 50 secondary fields of 312 lines per second, i.e. retaining one band width of the video signal of 6 MHz, and to obtain, for example with a factor $K = 5$, images analysed on the basis of 10 principal fields of 1560 lines per second, which would give a quality equivalent to that of a standard of 3120 lines.

It is necessary to introduce into the video signal thus obtained a reference signal which identifies one secondary fields, for example the first, in each cycle of 2 K secondary fields to enable the reproduction apparatus to be synchronised.

The video signal thus obtained may then be recorded by any process in which video signals corresponding to K successive subframes of the same parity are simultaneously available during the subsequent reading of the recording. To this end, it is convenient to record this video signal on an ordinary video disc bearing a spiral track on which the points with the same abscissa of the various analysis lines are recorded along a common radius of the disc (thus 2 secondary fields per revolution for example are recorded). By reading this disc with a reading head which simultaneously delivers the content of K consecutive track elements along one radius, video signals of the K secondary fields to be reproduced will be made available, thereby creating the simultaneous access memory effect required for carrying out the invention.

This reading head may be made up of an optical device which focuses K light beams onto the track elements to be read, and of another optical device which collects the light thus transmitted through the disc and forms an image of these track elements on K photoelectric detectors. A more simple solution would be to utilise the reflection disc, using the same optical device for emitting and for collecting the light and separating the outgoing and return beams by means of a semi-transparent mirror. Light could also be emitted through a slot directed along a radius of the disc, provided that the other elements are regulated to give a maximum signal-to-noise ratio.

Figure 2:
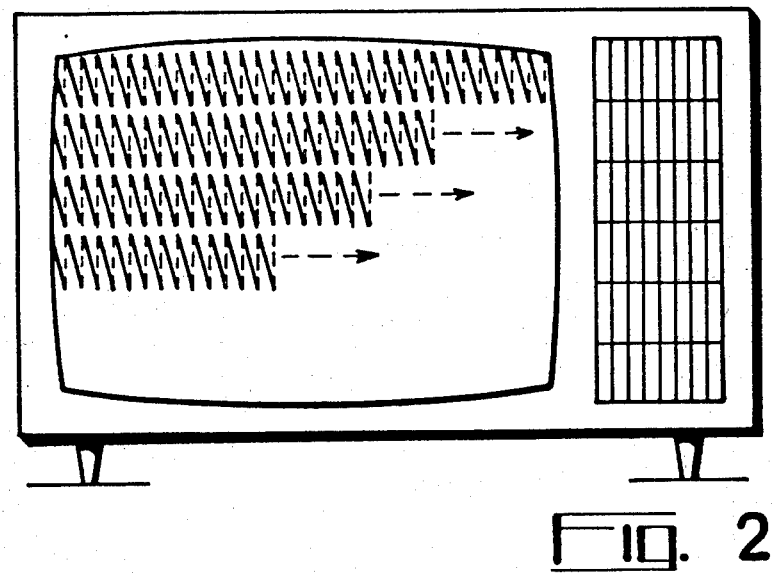
FIG. 2 illustrates diagrammatically a television receiver utilising a scan according to the invention.

It is thus necessary to simultaneously reproduce the K lines corresponding to these K video signals. FIG. 2 diagrammatically illustrates a television receiver utilising a special scan by which it is possible to obtain adequate quasi-simultaneity for this reproduction.

This scan may be described as being composed of a primary scan along a secondary field such as defined earlier on, and of a secondary vertical sawtooth scan superimposed upon the primary scan.

FIG. 3a illustrates part of such a scan drawn correlatively to FIG. 1 : K = 4, the lines 1 to 8 represent fragments of the secondary fields 1 to 8. The path of the spot on the screen is represented by the lines 30 and 31.

FIG. 3b represents the video signals recorded during analysis of the secondary fields 1 to 8 and subsequently read during reproduction, $V_1$ corresponding to the secondary field 1 and so on.

When, during scanning along the path 30, the spot passes the station 321, the signal $V_1$ corresponding to the subframe 1, on which the station 321 is situated, is sampled on the basis of the sample 311. The value of this sample serves to modulate the electron beam which produces this spot of which the luminosity is thus proportional to that value.

Similarly, the value of the sample 313 determines the luminosity of the spot at the station 323 and so on for the entire series of sample-spot location coincidences 310 – 320 to 319 – 329.

Thus, commensurate with progression along the lines of the primary scan, the secondary vertical sawtooth scan enables the K secondary fields corresponding to the K video signals read simultaneously on the video disc to be reproduced by sampling. To this end, however, the sawtooth of the secondary scan has to be inverted with each change of frame of the primary scan to take into account the direction of the stagger between the even secondary fields and the odd secondary fields. It can be seen in particular that, in FIG. 3a, sampling takes place during the descending part of the sawtooth 30 and during the ascending part of the sawtooth 31. The samples also have to be taken in the correct order, which necessitates a circular permutation among the K video signals because, each time the reading of a set of 2 K signals comes to an end, the 2 oldest signals are no longer read and the signals following the 2 most recent signals of the set replace them (this corresponds for example to the advance of the reading head at the end of one revolution of the video disc).

For the resolution of the signal reproduced to be adequate, the interval between two locations of the spot on the same secondary field line reproduced must not be any greater than the distance between two significant points defined by this same resolution. In order to optimise the system, it is generally desirable to have the same resolution in the vertical direction and in the horizontal direction, which means that, in this case, the distance between, for example, the stations 321 and 329 must not be any greater than the distance between the lines 1 and 8. Accordingly, this shows that the drawings of FIG. 3 were drawn on a larger scale in the horizontal direction than in the vertical direction in the interests of clarity.

This condition regarding the locations of the spot provides us with a condition in respect of the recurrence period of the sawtooth of the secondary scan and hence in respect of its frequency. The maximum horizontal resolution may be linked to the band width of the video signal, observing that a signal of frequency equal to the maximum upper frequency of this band width gives on the lines a succession of black and white dots which mark precisely this maximum resolution. Accordingly, the recurrence frequency of the sawtooth must be equal to the maximum frequency of the video signal recorded. Taking once again as reference the standard of 625 lines subdivided by the factor K = 4, this frequency will thus be 1.5 MHz. Since the 4 video signals are sampled successively as a function of time at this same frequency, the frequency at which all the samples will occur will be 1.5 × 4 = 6MHz, which gives the initial resolution and hence the required result.

FIG. 4 is a block diagram of a device which samples the K video signals $V_1$ to $V_K$ supplied by the reader and which delivers to the reproduction apparatus (a television receiver like that shown in FIG. 2 for example) the modulation signal M, the frame synchronisation signal T, the secondary scan synchronisation signal S and the sawtooth inversion signal I.

This device comprises a signal generator 410, three counters by K 411, 412 and 413, a subframe detector 414, a first primary frame detector 415, a bistable multivibrator 416, a validation circuit 417, K samplers 418 and an adder 419.

The generator 410 supplies a periodic signal at K times the recurrence frequency of the secondary scan. The counter 412, by dividing by K the signal provided by his generator 410, supplies the secondary scan synchronisation signal S. This counter 412 is reset to zero at the beginning of each secondary field by the signal T supplied by the detector 414 which detects the secondary field synchronisation signal present in $V_1$, so that the sawtooth always begins in phase with the primary scan which is synchronised by this same signal T.

The counter 413 turns at the rhythm of the pulses which it receives from the generator 410 and its states make the samplers 418 function successively by sampling control signals. Since this counter 413 has K positions and receives a signal at K times the sampling frequency, each of its K states will thus deliver signals at this sampling frequency.

The samples coming from the samplers 418 are collected by the adder 419 to give the modulation signal M.

The counter 411 turns at the rhythm of the signals T. Its states are validated at the beginning of each secondary field by this same signal T in the enabling circuit 417 which is made up for example of a series of gates which allow these states through under the control of T. Thus, at the beginning of each secondary field, the positioning signals emanating from the circuit 417 position the counter 413 in the same state as the counter 411. In this way, the counter 413 can be made at the beginning of each subframe to start in a position which enables the required samples to be obtained at the proper place of the sawtooth. The reproduction apparatus is also synchronised in subframe scanning by T.

The first principal field detector 415 detects the reference signal present in $V_1$ which identifies this field and resets to zero the counter 411 at the beginning of reading and in the event of subsequent loss of synchronization. It also positions the bistable multivibrator 416 which delivers the secondary scan direction signal I which determines the direction of the sawtooth. This trigger circuit then changes state at the rhythm of the signal T so as to control inversion of the sawtooth with each change of frame of the primary scan of the reproduction apparatus.

Accordingly, the apparatus thus described by way of example performs the function of a decoder placed between the reading apparatus and the reproduction apparatus.

What we claim is:

1. A method for displaying a picture film, said film comprising a succession of images, said method comprising the step of:

analysing each of said images on a frame comprising at least one principal field of K × L lines (L and K being positive integers) said principal field being divided into K interlaced secondary fields, said secondary fields being analysed successively for providing a first plurality of K successive video signals, and said video signals having a bandwidth extending to a fixed upper frequency;

recording successively said K successive video signals onto a video-disc bearing a spiral track comprising whorls; each of said successive video signals corresponding to a complete whorl;

reading out simultaneously K successive whorls for providing a second plurality of K video signals;

sampling successively the video signals of said second plurality at a rate substantially equal to said upper frequency, for providing a succession of samples;

collecting said samples for providing a modulation signal; and modulating display means actuated by said modulation signal; said display means being scanned along a composite raster consisting of a primary raster of L lines and a secondary raster formed with a sawtooth superimposed upon said primary raster; said composite raster distributing said samples for reconstructing the initial field of K × L lines.

2. A method as claimed in claim 1, wherein said frame comprises two successive interlaced principal fields.

3. A coding device for coding K, (K being a positive integer) single video signals representing simultaneously K secondary fields, into a complex video signal representing a principal field composed by interlacing said K secondary fields, and providing secondary field synchronization signals, secondary scan direction signals, said coding device comprising:

means for extracting from one of said K single video signals said secondary field synchronisation signals;

means for extracting from said one K single video principal field synchronisation signals;

first counting means for counting said secondary field synchronisation signals, providing positionning signals; said counting means being reset to zero by said principal field synchronisation signal;

a generator for providing internal clock signals;

second counting means for counting said internal clock signals, providing sampling signals;

enabling means for validating said positioning signal under the control of said secondary field synchronisation signals, and positionning said second counting means in the same state as first counting means;

sampling means for sampling said K single video signals under the control of said sampling signals, providing a succession of samples;

adding means for collecting said samples, providing said complex video signal;

third counting means for counting said internal clock signals, providing said secondary scan synchronisation signals; said third counting means being reset to zero by said secondary field synchronisation signals; and bistable means for providing said secondary scan direction signals under the control of said principal field synchronisation signals; said bistable means being reset to a fixed position by said secondary field synchronisation signals.

* * * * *